(12) United States Patent
Martin et al.

(10) Patent No.: US 10,113,674 B2
(45) Date of Patent: Oct. 30, 2018

(54) ASSEMBLY FOR PRODUCING A THREADED CONNECTION FOR DRILLING AND OPERATING HYDROCARBON WELLS, AND RESULTING THREADED CONNECTION

(71) Applicants: VALLOUREC OIL AND GAS FRANCE, Aulnoye-Aymeries (FR); NIPPON STEEL & SUMITOMO METAL CORPORATION, Chiyoda-ku (JP)

(72) Inventors: Pierre Martin, Marly (FR); Bruno Legrand, Maroilles (FR); Regis Moreau, Avesnes sur Helpe (FR)

(73) Assignees: VALLOUREC OIL AND GAS FRANCE, Aulnoye-Aymeries (FR); NIPPON STEEL & SUMITOMO METAL CORPORATION, Chiyoda-ku (JP)

( * ) Notice: Subject to any disclaimer, the term of this patent is extended or adjusted under 35 U.S.C. 154(b) by 470 days.

(21) Appl. No.: 14/905,216

(22) PCT Filed: Jul. 8, 2014

(86) PCT No.: PCT/EP2014/064636
§ 371 (c)(1),
(2) Date: Jan. 14, 2016

(87) PCT Pub. No.: WO2015/007579
PCT Pub. Date: Jan. 22, 2015

(65) Prior Publication Data
US 2016/0161031 A1    Jun. 9, 2016

(30) Foreign Application Priority Data

Jul. 18, 2013 (FR) ..................... 13 57082

(51) Int. Cl.
| | | |
|---|---|---|
| *F16L 15/06* | (2006.01) | |
| *E21B 17/042* | (2006.01) | |
| *F16L 15/00* | (2006.01) | |

(52) U.S. Cl.
CPC ............ *F16L 15/06* (2013.01); *E21B 17/042* (2013.01); *F16L 15/001* (2013.01)

(58) Field of Classification Search
CPC .... F16L 15/009; F16L 15/004; F16L 2201/80
See application file for complete search history.

(56) References Cited

U.S. PATENT DOCUMENTS

| | | |
|---|---|---|
| 4,494,777 A | 1/1985 | Duret |
| 2005/0212290 A1 | 9/2005 | Durand et al. |
| 2010/0102553 A1 | 4/2010 | Patureau et al. |

FOREIGN PATENT DOCUMENTS

| | | |
|---|---|---|
| CN | 1786542 A | 6/2006 |
| CN | 102639911 A | 8/2012 |

(Continued)

OTHER PUBLICATIONS

International Search Report and Written Opinion of the International Searching Authority dated Aug. 21, 2014 in PCT/EP14/64636 Filed Jul. 8, 2014.

*Primary Examiner* — David Bochna
*Assistant Examiner* — James A Linford
(74) *Attorney, Agent, or Firm* — Oblon, McClelland, Maier & Neustadt, L.L.P.

(57) ABSTRACT

An assembly producing a threaded connection, including first and second tubular components with an axis of revolution and each respectively including at one end at least a first continuous threaded zone following a first helix on an outer or inner circumferential surface depending on whether the threaded end is male or female in type, and configured to cooperate together upon makeup. The first threaded zones of the ends include a variable width dovetail thread profile, (Continued)

the ends respectively finishing in a terminal surface. At least one of the ends include a lip provided between the threaded zone and the terminal surface, the lip carrying a sealing surface configured to cooperate in a sealing interference fit with a corresponding sealing surface disposed facing the other end when the connection is in the made-up state. The lip is hollowed out by a groove adjoining the threaded zone and the sealing surface.

14 Claims, 4 Drawing Sheets

(56) References Cited

FOREIGN PATENT DOCUMENTS

| | | |
|---|---|---|
| FR | 2 913 746 A1 | 9/2008 |
| JP | 2000-240862 A | 9/2000 |
| JP | 2007-504420 A | 3/2007 |
| JP | 2012-507016 A | 3/2012 |
| WO | 03/060369 A1 | 7/2003 |
| WO | WO 2008/110494 A1 | 9/2008 |

ASSEMBLY FOR PRODUCING A THREADED CONNECTION FOR DRILLING AND OPERATING HYDROCARBON WELLS, AND RESULTING THREADED CONNECTION

The present invention relates to threaded connections for drilling and/or operating hydrocarbon wells, and more precisely optimizing the overall performance of a connection in terms of efficiency and seal when the connection works under compression/tension.

The term "threaded connections" means any assembly constituted by elements which are substantially tubular in shape, metallic and capable of being connected together by makeup with a particular view to constituting either a stem for drilling a hydrocarbon well, or a riser for maintenance (also known as a work-over riser), or for operating such a well, such as a riser, or a casing or tubing string used in operating a well.

Each tubular element comprises an end portion provided with a male threaded zone or a female threaded zone for making up with a corresponding end portion of an analogous element. When assembled, the elements make up what is known as a connection.

Such tubular threaded components of a connection are assembled under pre-set loads in order to respond to the interference fit and sealing requirements imposed by the service conditions. Furthermore, it should be noted that the threaded tubular components may have to undergo several makeup-breakout cycles, in particular when in service.

The conditions under which such threaded tubular components are used gives rise to an extensive range of mechanical loads which act on sensitive portions of those components such as the threaded zones, abutment zones or the sealing surfaces.

For this reason, connection design specifications are complex, requiring taking a number of parameters into account simultaneously. Thus, it is recommended that the efficiency of the connection be preserved, as well as the thickness of the zone of the tubular components which bears the sealing surfaces, and that the risks of displacing the sealing contact points when the connection operates under compression/tension should be minimized.

One type of solution has been developed through the connections described in document WO 2008/110494. Such connections are characterized in that the male and/or female end comprises a lip provided with a groove disposed at the threading discharge, just in front of the sealing surface. That groove can be used to reduce the thickness of said end and at the same time to reduce the radial stiffness in a manner such that the zone in the vicinity of the groove is apt to be deformed radially by a pressure which is exerted on it. This then means that the contact between the sealing surfaces can be maintained.

However, tests have shown that the axial length of a groove of this type is too long, which means that the radial deformation of the zone in the vicinity of the groove frequently goes beyond the elastic region. Very often, plastification of that zone occurs, resulting in buckling of the lip and as a result in a loss of contact at the sealing surfaces.

For this reason, the aim of the invention is to prevent the risk of buckling in the vicinity of the end when the connection operates under bending or when the end of the tubular components is subjected to radial pressures. More particularly, the invention is applicable to limiting the maximum axial length of the groove in the case of connections with radially interference fitting threadings and with a dovetail thread profile.

More precisely, the invention concerns an assembly for producing a threaded connection, comprising a first and a second tubular component with an axis of revolution and each respectively provided at one of their ends with at least one first continuous threaded zone following a first helix on the outer or inner circumferential surface of the component depending on whether the threaded end is male or female in type, and being capable of cooperating together upon makeup, the first threaded zones of the ends having a variable width dovetail thread profile, said ends respectively finishing in a terminal surface, at least one of the ends being provided with a lip provided between the threaded zone and the terminal surface, said lip carrying a sealing surface which is capable of cooperating in a sealing interference fit with a corresponding sealing surface disposed facing the other end when the connection is in the made up state, characterized in that the lip is hollowed out by a groove adjoining on the one hand the threaded zone and on the other hand the sealing surface, the length (GL) of the groove being calculated as follows:

$$GL \geq 0.4 \times \left( \frac{LFL}{n \times 2} - \frac{TL - RLP}{LFL} \times (LFL - SFL) \right)$$

$$GL \leq 2 \times \left( \frac{LFL}{n \times 2} - \frac{TL - RLP}{LFL} \times (LFL - SFL) \right)$$

in which:
LFL value for the pitch of the load flanks;
SFL value for the pitch of the stabbing flanks;
TL threading length;
RLP reference position length;
n number of helixes in threading.

Optional complementary or substitutional features of the invention are set out below.

The values for the parameters LFL, SFL, TL, RPL and n may be limited as follows:

4 mm<$LFL$<20 mm;

4 mm<$SFL$<20 mm;

20 mm<TL<300 mm;

10 mm<RLP<150 mm;

1<$n$<4.

The values for the parameters LFL, SFL, TL, RPL and n may be limited as follows:

10 mm<$LFL$<17 mm;

10 mm<$SFL$<17 mm;

40 mm<TL<160 mm;

20 mm<RLP<80 mm;

$n=2$.

The first threaded zones of the ends may have a dovetail thread profile with a variable width and be self-locking.

The first threaded zones of the ends may have a dovetail thread profile with a near zero variable width such that:

$LFL=SFL=P$ (pitch of threading)

Viewed in a longitudinal section passing through the axis of revolution, the groove may be constituted by an annular portion linked to the threaded zone via a first inclined portion and linked to the zone comprising the sealing surface via a second inclined portion.

The thickness of the groove may be less than the thickness of the lip by an amount (p) of 0.2 to 2.5 mm.

The first inclined portion may form an angle α in the range 20° to 75° with the axis of revolution of the connection.

The second inclined portion may form an angle β in the range 5° to 90° with the axis of revolution of the connection.

The sealing surface of the lip may be a domed surface with a radius in the range 30 to 100 mm, while the corresponding sealing surface is a tapered surface the tangent to the peak half angle of which is in the range 0.025 to 0.25, i.e. a taper in the range 5% to 50%.

A radial gap TRG in the range 0.05 to 0.5 mm may be provided between the crests of the male threads and the roots of the female threads.

The threaded zone may have negative stabbing flank angles SFA in the range 1 to 15 degrees, preferably in the range 5 to 8 degrees.

The threaded zone may have negative load flank angles LFA in the range 1 to 15 degrees, preferably in the range 5 to 8 degrees.

The threaded zones of each end may extend along the same taper generatrix with a slope in the range 5% to 25%, preferably in the range 10% to 18%.

Each of the ends of the tubular components may comprise at least one second continuous threaded zone produced on another helix, of the multi-start type.

The invention also concerns a threaded connection resulting from making up an assembly in accordance with the invention.

The features and advantages of the invention are disclosed in more detail in the description below, made with reference to the accompanying drawings.

Figure 1:
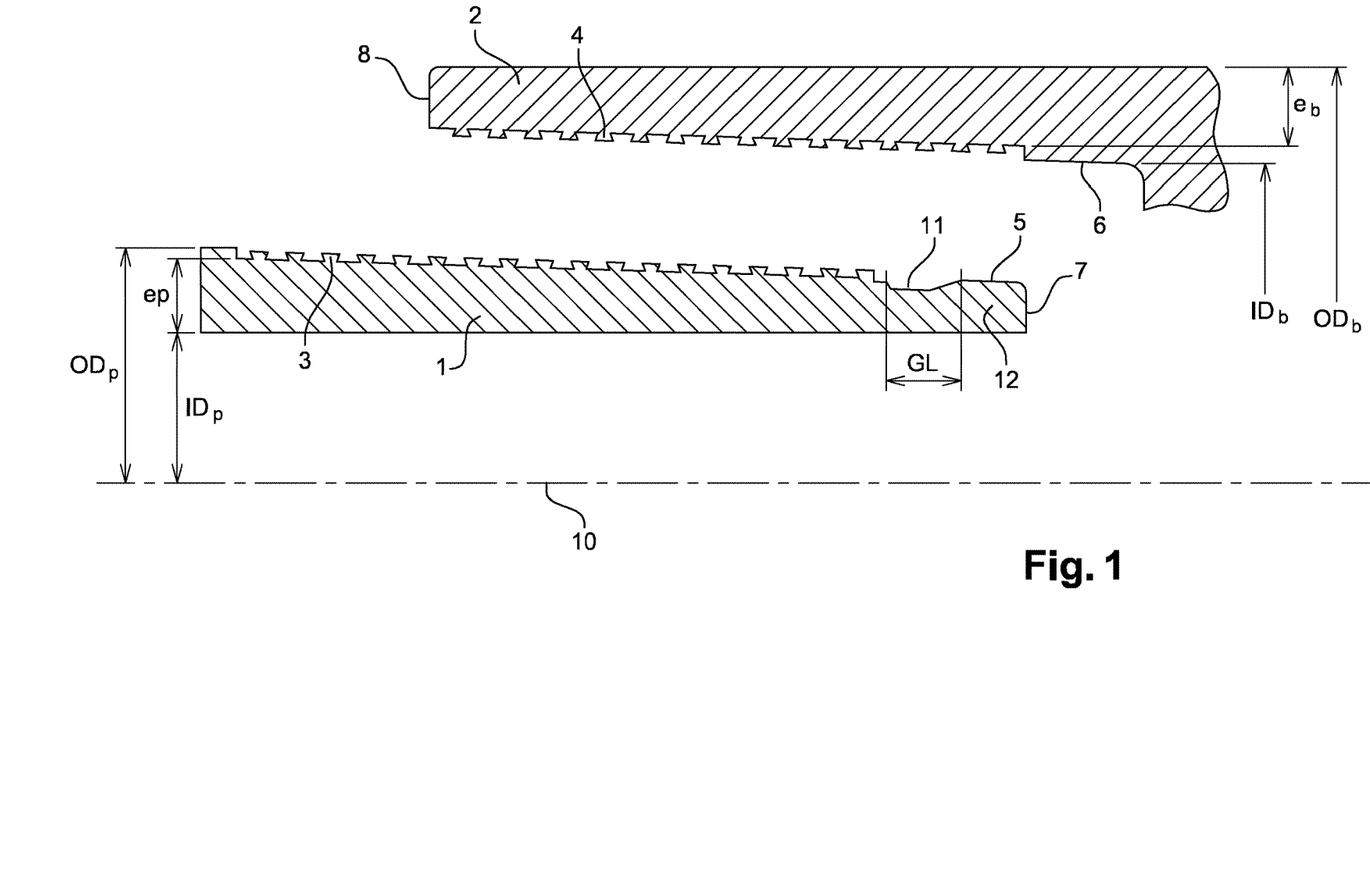
FIG. 1 is a diagrammatic view in longitudinal section of a connection resulting from connecting two tubular components by makeup, and is in accordance with one embodiment of the invention.

FIG. 1 shows an assembly for producing a threaded connection, comprising a first and a second tubular component with an axis of revolution 10. One of the components is provided with an end known as the male end 1 comprising a first continuous threaded zone 3 produced on the outer circumferential surface of the component and following a first helix. The term "continuous threaded zone" means that the threaded zone has no interruptions in the threading.

In a variation, it is possible to provide, on the end 1, a second threaded zone following a second helix, taking care, of course, that the first and second threaded zones are synchronous so as to allow makeup.

The other component is provided with an end termed the female end 2 comprising a continuous first threaded zone 4 produced on the inner circumferential surface of the component and following a first helix. The term "continuous threaded zone" means that the threaded zone 4 has no interruptions in its threading.

In a variation, it is possible to provide, on the end 2, a second threaded zone following a second helix taking care, of course, that the first and second threaded zones are synchronous so as to allow makeup.

The continuous threaded zones 3 and 4 are respectively capable of cooperating together on makeup.

The ends 1 and 2 respectively terminate in a terminal surface 7 and 8. Each of the terminal surfaces may or may not abut against a corresponding abutment surface provided on the end of the other tubular component during makeup.

A sealing surface 5 is provided on the male end 1, on a lip 12, said lip being defined as a portion of the circumferential outer surface of the end 1 delimited on the one hand by the threaded zone 3 and on the other hand by the terminal surface 7. It is capable of cooperating in a sealing interference fit with a corresponding sealing surface 6 provided on the female end 2 when the connection is in the made up state.

FIG. 1 also shows the thickness of the male end 1, ep, also termed the critical section of the male end 1, defined not by the difference between the outer diameter ODp and the inner diameter IDp of said end, but at the base of the threaded zone 3, i.e. at the last thread. Similarly, the thickness of the female end 2, eb, also termed the critical section of the female end 1, is not defined by the difference between the outer diameter ODb and the inner diameter IDb of the female end, but at the base of the threaded zone 4, i.e. at the last thread.

Thus, the critical section of the male end is defined from the thickness of the male end 1, ep, and the critical section of the female end is defined from the thickness of the female end 2, eb, said critical sections in fact being the surfaces made by a cross section of the male or female ends at the zones with thickness ep and eb.

Thus, the efficiency of the connection is defined as being equal to the ratio between the minimum value between the critical section of the male end and the critical section of the female end and the regular section of the tube. Naturally, the regular section of the tube has to be taken from the thickness of the threaded components measured at a distance from the threaded zones. This thickness is thus constant for the male component and for the female component. This thickness can equally be calculated from the difference between ODb and IDb, as from the difference between ODp and IDp. The notion of efficiency of the connection is linked to the fatigue strength of the connection.

In accordance with the invention and as shown in FIGS. 2A, 2B, 3A and 3B, the threaded zones 3 and 4 have a "dovetail" thread profile viewed in longitudinal section passing through the axis 10. This implies that the stabbing flanks 35 and the load flanks 36 of the threads 34 of the male threaded zone 3 are negative.

Similarly, the stabbing flanks 45 and the load flanks 46 of the threads 44 of the female threaded zone 4 are also negative. This dovetail profile means that jumpout of the threads when the made up connection is under load or when it operates under bending can be avoided.

Figure 3A:
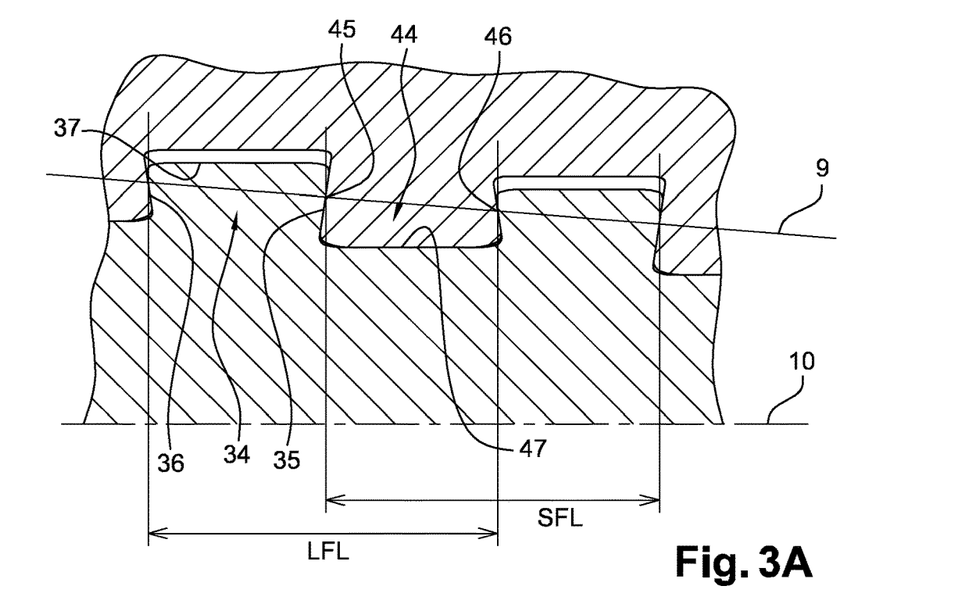
FIGS. 3A and 3B are each a diagrammatic view in longitudinal section of a detail of a threaded zone of a connection resulting from connecting two tubular components by makeup, and in accordance with another embodiment of the invention.
Figure 3B:
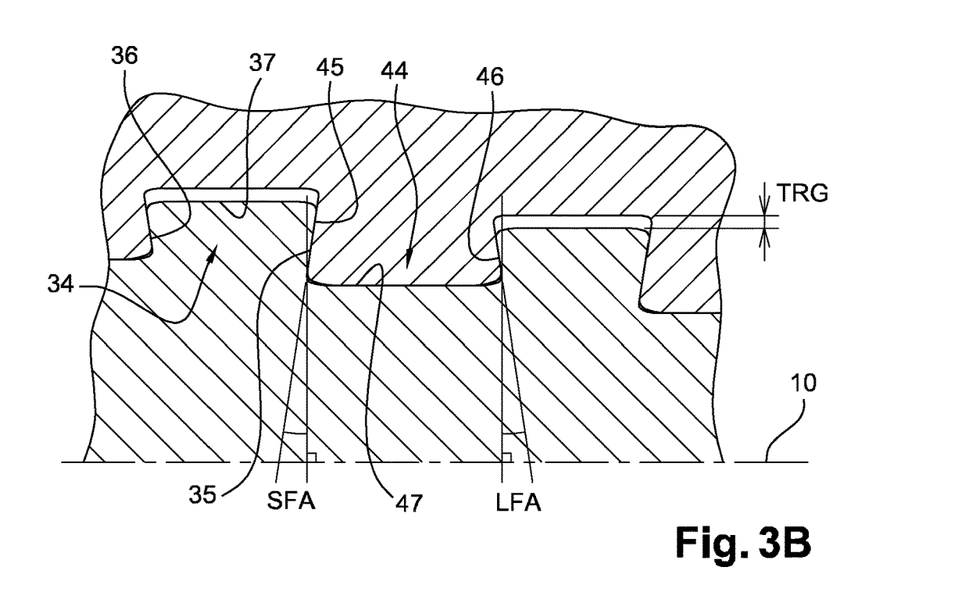

In accordance with the invention and as can be seen in FIGS. 3A and 3B, the threaded zones 3 and 4 have a "variable width" thread profile. This means that the male thread flanks (or teeth) 34, like the female thread flanks (or teeth) 44, have a constant pitch, while the width of the threads decreases in the direction of the respective terminal surfaces.

More precisely, the pitch LFL between the load flanks 46 of the female threaded zone is constant, as is the pitch SFL between the stabbing flanks 45 of the female threaded zone, with the particular feature that the pitch between the load flanks is greater than the pitch between the stabbing flanks.

Similarly, the pitch SFL between the male stabbing flanks 35 is constant, as is the pitch LFL between the male load flanks 36. In addition, the respective pitches SFL of the male 35 and female stabbing flanks 45 are equal to each other and less than the respective pitches LFL of the male 36 and female 46 load flanks, which in turn are mutually equal.

As is conventional, the width of the threads, like the pitch between the flanks, is measured at the thread half-height.

In various variations, the threaded zones 3 and 4 may or may not be self-locking. In the case of a self-locking threading, the male and female threads (or teeth) end up by being locked at the end of makeup one in the other in a predetermined position.

In the case of a threading which is not self-locking, the connection may comprise an internal and/or external abutment such that the load flanks and/or the stabbing flanks are not in contact.

In accordance with the invention, on the lip 12, between the threaded zone 3 and the sealing surface 5, there is a groove 11 with a short length GL. The term "short length" means that the groove 11 extends over a reduced length with respect to the prior art with a maximum value determined as follows:

$$GL \leq 2 \times \left( \frac{LFL}{n \times 2} - \frac{TL - RLP}{LFL} \times (LFL - SFL) \right)$$

in which:
LFL value for the pitch of the load flanks;
SFL value for the pitch of the stabbing flanks;
TL threading length;
RLP reference position length;
n number of helixes in threading.

By definition, the reference length position RLP is the distance between the thread closest to the terminal surface and the region in the threading where the width of the thread valleys is equal to the width of the thread crests.

In order to allow the threaded zones to be machined, the groove 11 has a minimum value which is determined as follows:

$$GL \geq 0.4 \times \left( \frac{LFL}{n \times 2} - \frac{TL - RLP}{LFL} \times (LFL - SFL) \right)$$

Figure 2A:
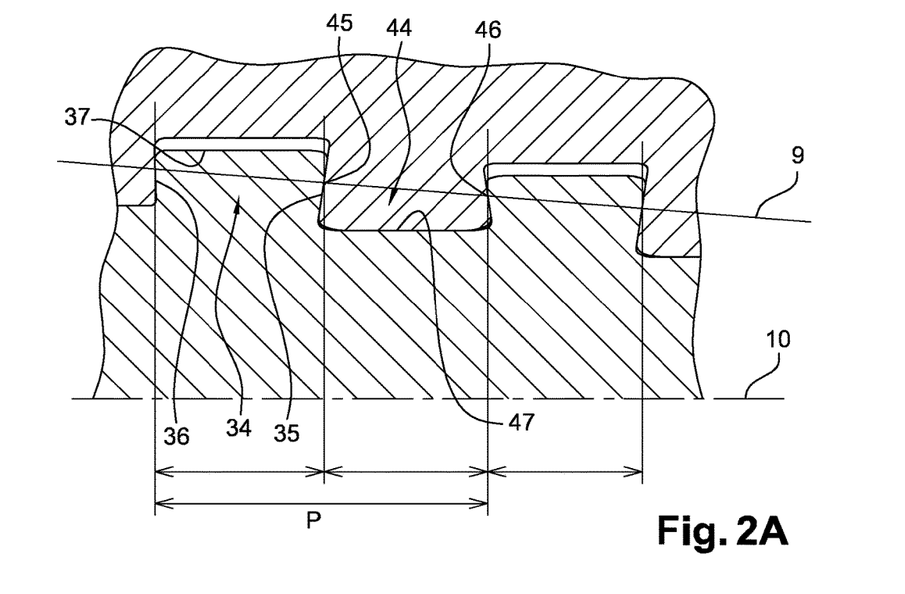
FIGS. 2A and 2B are each a diagrammatic view in longitudinal section of a detail of a threaded zone of a connection resulting from connecting two tubular components by makeup, and in accordance with one embodiment of the invention.
Figure 2B:
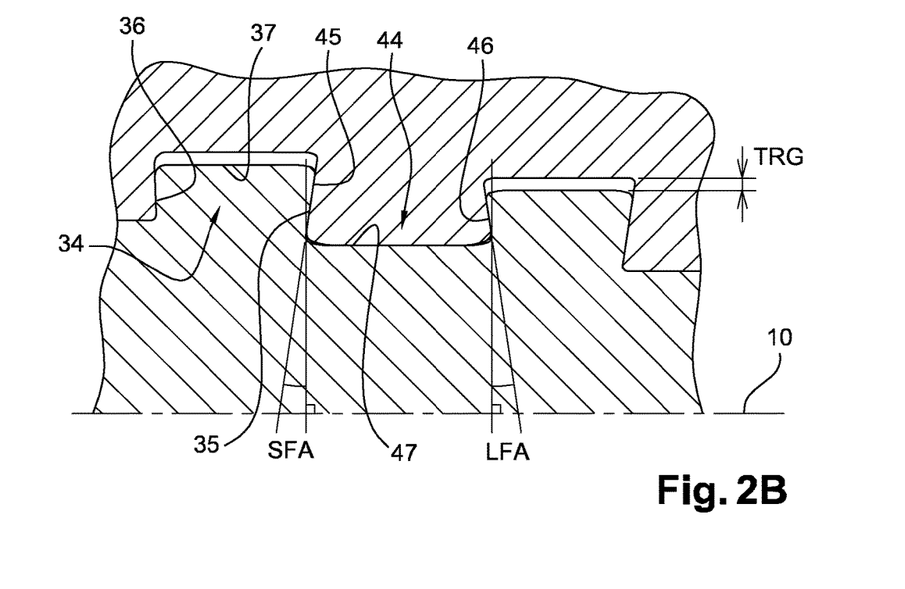

In a particular embodiment of the invention described in FIGS. 2A and 2B, the variation in the width of the threads is almost zero, such that LFL and SFL are equal and correspond to the pitch P of the threading. The relationship for the short length GL of the groove 11 therefore simplifies to:

$$0.2P/n < GL < P/n$$

Advantageously, the values for the parameters LFL, SFL, TL, RPL and n are limited as follows:

4 mm<LFL<20 mm;

4 mm<SFL<20 mm;

20 mm<TL<300 mm;

10 mm<RLP<150 mm;

1<n<4.

Advantageously, in the case in which threaded zones 3 and 4 are self-locking, the values for the parameters LFL, SFL, TL, RPL and n are limited as follows:

10 mm<LFL<17 mm;

10 mm<SFL<17 mm;

40 mm<TL<160 mm;

20 mm<RLP<80 mm;

n=2.

Figure 4:
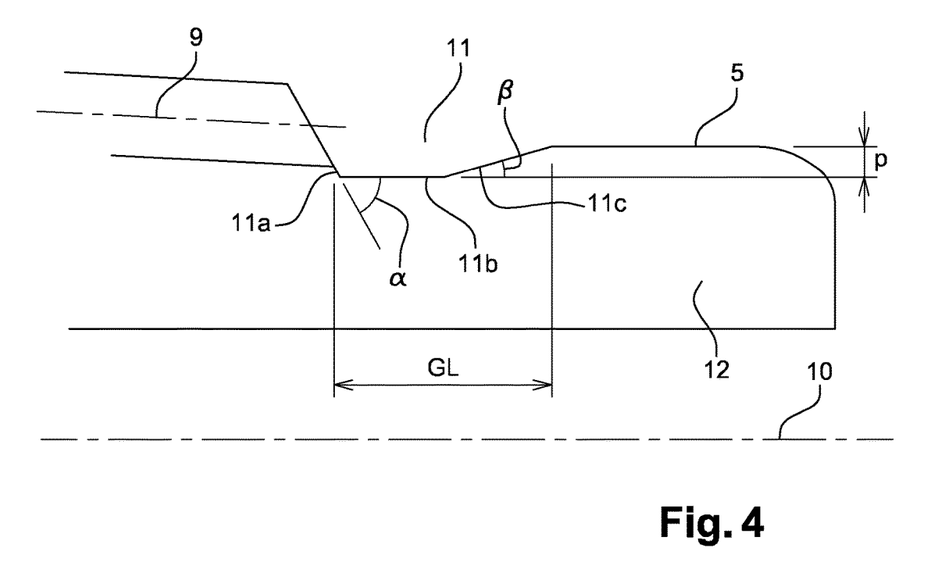
FIG. 4 is a detailed view of the invention.

Advantageously, and as can be seen in FIG. 4, viewed in longitudinal section passing through the axis of revolution 10, the groove 11 is constituted by an annular portion 11b linked to the threaded zone via a first inclined portion 11a and linked to the zone comprising the sealing surface via a second inclined portion 11c. This design means that machining is relatively simple. Clearly, the various portions are linked together and to the threaded zone 3 and the sealing zone 5 in a conventional manner, i.e. via radii of curvature.

In order to avoid any plastic deformation of the lip 12, the thickness of the groove 11 is less than the thickness of the lip 12 by a thickness p of 0.2 to 2.5 mm.

In order to facilitate engagement of the male and female elements at the start of makeup, the first inclined portion 11a forms an angle α in the range 20° to 75° with the axis of revolution 10 of the connection.

In order to facilitate machining of the groove 11, the second inclined portion 11c forms an angle β in the range 5° to 90° with the axis of revolution 10 of the connection.

Advantageously, the sealing surfaces cooperating together to seal in an interference fit can form a torus-on-cone contact. This type of contact, known as a "point" contact, is in fact more stable.

Advantageously, the toroid surface is a domed toroid convex surface the radius R of which is preferably in the range 30 to 100 mm. Too large a radius, i.e. more than 100 mm, for the toroid surface induces identical disadvantages to those of a cone-on-cone contact. Too small a radius, i.e. less than 30 mm, induces an insufficient contact width.

Facing the toroid sealing surface, the tapered sealing surface is supported by a taper generatrix forming an angle with the axis 10 of the connection the tangent to the peak half angle of which is in the range 0.025 to 0.25, which corresponds to a taper in the range 5% to 50%.

Advantageously and as shown in FIGS. 3A and 3B, the continuous threaded zone with a variable width thread profile formed as a dovetail may have a radial gap TRG between the thread crests and roots in the range 0.05 to 0.5 mm. In this manner, the gap is provided between the male thread crests 37 and the female thread roots 47. It may be between the female thread crests and the male thread roots. In this manner, free volumes are provided that can collect grease during makeup and avoid zones of excess pressure.

It should be noted that a radial gap TRG between the thread crests and roots is also applicable in the case in which the threads have a constant width, as shown in FIGS. 2A and 2B.

Preferably, the radial gap TRG between the thread crests and roots is in the range 0.1 to 0.3 mm. This value means that there is sufficient free volume to store the grease without affecting the connection efficiency.

Advantageously and in order to minimize the radial gap at the threaded zones during pressure loading, the threaded zone has negative stabbing flank angles SFA in the range 1 to 15 degrees, preferably in the range 5 to 8 degrees.

Advantageously and in order to minimize the radial gap at the threaded zones during pressure loading, the threaded zone has negative load flank angles LFA in the range 1 to 15 degrees, preferably in the range 5 to 8 degrees.

Advantageously and in order to facilitate engaging of the male and female elements at the start of makeup, the threaded zones of each end 1, 2 extend along the same taper generatrix 9 with a slope in the range 5% to 25%, preferably in the range 10% to 18%.

The invention is also of application to any type of connection, whether it is of the coupled, flush or semi-flush type.

Clearly, the invention comprises a configuration in which the female end alone and not the male end comprises a lip provided with a sealing surface with a groove in accordance with the invention.

Clearly, the invention comprises a configuration in which the male and female ends alone comprise a plurality of successive threaded zones disposed on the same helix, and not a single continuous threaded zone.

The invention also comprises a configuration in which the female end in addition to the male end also comprises a lip provided with a sealing surface with a groove in accordance with the invention.

This type of threading can be used to reinforce the lip of connections with a dovetail thread profile and guarantee better control of the radial stiffness of the lip.

The invention claimed is:

1. An assembly for producing a threaded connection, comprising:
    a first and a second tubular component with an axis of revolution and each respectively including at one of their ends at least a first continuous threaded zone following a first helix on an outer or inner circumferential surface of the component depending on whether the threaded end is male or female in type, and configured to cooperate together upon makeup,
    the first threaded zones of the ends including a variable width dovetail thread profile viewed in longitudinal section passing through the axis, the ends respectively finishing in a terminal surface,
    at least one of the ends including a lip provided between the threaded zone and the terminal surface, the lip carrying a sealing surface configured to cooperate in a sealing interference fit with a corresponding sealing surface disposed facing the other end when the connection is in the made up state,
    wherein the lip is hollowed out by a groove adjoining the threaded zone and the sealing surface, the length of the groove being calculated as follows:

$$GL \geq 0.4 \times \left( \frac{LFL}{n \times 2} - \frac{TL - RLP}{LFL} \times (LFL - SFL) \right)$$

$$GL \leq 2 \times \left( \frac{LFL}{n \times 2} - \frac{TL - RLP}{LFL} \times (LFL - SFL) \right)$$

in which:
LFL is a value for pitch of load flanks;
SFL is a value for pitch of stabbing flanks;
TL is a threading length;
RLP is a reference position length;
n is a number of helixes in threading, wherein viewed in a longitudinal section passing through the axis of revolution, the groove includes an annular portion linked to the threaded zone via a first inclined portion and linked to the zone comprising the sealing surface via a second inclined portion, and wherein thickness of the groove is less than thickness of the lip by an amount of 0.2 to 2.5 mm.

2. An assembly for producing a threaded connection according to claim 1, wherein values for parameters LFL, SFL, TL, RPL and n are limited as follows:

4 mm<$LFL$<20 mm;

4 mm<$SFL$<20 mm;

20 mm<TL<300 mm;

10 mm<RLP<150 mm;

1<$n$<4.

3. An assembly for producing a threaded connection according to claim 2, wherein values for parameters LFL, SFL, TL, RPL and n are limited as follows:

10 mm<$LFL$<17 mm;

10 mm<$SFL$<17 mm;

40 mm<TL<160 mm;

20 mm<RLP<80 mm;

$n$=2.

4. An assembly for producing a threaded connection according to claim 1, wherein the first threaded zones of the ends include a dovetail thread profile with a variable width and that are self-locking.

5. An assembly for producing a threaded connection according to claim 1, wherein first threaded zones of the ends include a dovetail thread profile with a variable width such that:

$LFL=SFL=P$ (pitch of threading).

6. An assembly for producing a threaded connection according to claim 1, wherein the first inclined portion forms an angle α in a range of 20° to 75° with the axis of revolution of the connection.

7. An assembly for producing a threaded connection according to claim 1, wherein the second inclined portion forms an angle β in a range of 5° to 90° with the axis of revolution of the connection.

8. An assembly for producing a threaded connection according to claim 1, wherein the sealing surface of the lip is a domed surface with a radius in a range of 30 to 100 mm, while the corresponding sealing surface is a tapered surface the tangent to the peak half angle is in a range of 0.025 to 0.25, and a taper in a range of 5% to 50%.

9. An assembly for producing a threaded connection according to claim 1, wherein a radial gap in a range of 0.05 to 0.5 mm is provided between crests of the male threads and roots of the female threads.

10. An assembly for producing a threaded connection according to claim 1, wherein the threaded zone has negative stabbing flank angles in a range of 1 to 15 degrees.

11. An assembly for producing a threaded connection according to claim 1, wherein the threaded zone has negative load flank angles in a range of 1 to 15 degrees.

12. An assembly for producing a threaded connection according to claim 1, wherein the threaded zones of each end extend along a same taper generatrix with a slope in a range of 5% to 25%.

13. An assembly for producing a threaded connection according to claim 1, wherein each of the ends of the tubular components comprises at least a second continuous threaded zone produced on another helix, of multi-start type.

14. A threaded connection resulting from making up an assembly in accordance with claim 1.

* * * * *

UNITED STATES PATENT AND TRADEMARK OFFICE
CERTIFICATE OF CORRECTION

PATENT NO. : 10,113,674 B2
APPLICATION NO. : 14/905216
DATED : October 30, 2018
INVENTOR(S) : Pierre Martin et al.

Page 1 of 1

It is certified that error appears in the above-identified patent and that said Letters Patent is hereby corrected as shown below:

In the Claims

Column 8, Line 40, change "with a variable width" to --with a width--.

Signed and Sealed this
Fourteenth Day of January, 2020

Andrei Iancu
*Director of the United States Patent and Trademark Office*